UNITED STATES PATENT OFFICE.

AUGUSTE VICTOR LOUIS VERNEUIL, ALEXANDRE LOUIS GODEFROY-LEBEUF, AND ALBERT LÉON ARNAUD, OF PARIS, FRANCE.

PROCESS OF EXTRACTING INDIA-RUBBER.

SPECIFICATION forming part of Letters Patent No. 679,404, dated July 30, 1901.

Application filed August 10, 1900. Serial No. 26,522. (No specimens.)

*To all whom it may concern:*

Be it known that we, AUGUSTE VICTOR LOUIS VERNEUIL, ALEXANDRE LOUIS GODEFROY-LEBEUF, and ALBERT LÉON ARNAUD, citizens of the Republic of France, residing at Paris, France, have invented a certain new and useful Process of Extracting India-Rubber, of which the following is a full, clear, and exact specification.

This invention relates to an improved process for the extraction of india-rubber by purely mechanical means—that is to say, without the use of solvents of india-rubber or disaggregants of the insoluble base of the plant.

Our improved process consists in submitting the various parts of the india-rubber plants either in a desiccated condition or otherwise to a suitable mechanical treatment by means of stampers, grindstones, rollers, or the like in presence of a suitable quantity of water in such a manner as to separate the ligneous portions, which being reduced to a pulverulent condition become distinctly separated from the india-rubber, which agglutinates finally form a spongy mass.

This process may be employed whatever may be the richness of the plants treated in india-rubber and equally well with laudolphia-bark containing from ten to fifteen per cent. of india-rubber, for example, as with haucornia-bark, which contains five per cent. at the least.

According to this invention the bark is first of all pulverized in a dry condition by means of grindstones or in any other suitable manner, so as to reduce the superficial parts to powder. As this powder contains no india-rubber it is eliminated by sifting in a dry state. The part rich in india-rubber remaining upon the sieve is then submitted to treatment by the grindstone after having been steeped or largely impregnated by either hot or cold water. This treatment by the grindstone causes the formation of a thick and humid paste, which is sifted in water, preferably hot. The residue remaining upon the sieve contains all the india-rubber. The excess of water which it contains is expelled by compression or in other suitable manner, whereupon it is again submitted to crushing by means of the grindstone. The whitish filaments characteristic of the separation of india-rubber then appear and finally become agglomerated in the form of small spongy masses when the bark employed is not too poor. If this does not take place, it is necessary to effect a fresh sifting in water in order to eliminate a fresh quantity of ligneous powder and then to continue the operation in the manner above described. The necessary sifting for effecting all these successive separations may be very advantageously effected by means of hydraulic sieves, such as are successfully employed in the mining industry and of which an entirely novel use is made by us. As is well known, this method of sifting is based upon the employment of fixed sieves arranged stationary in a vessel, within which a reciprocating movement is imparted to the water by means of a compressing-piston.

In addition to the great advantage of requiring but little motive force the hydraulic sieve presents the further advantage of facilitating the classification in order of density of the solid materials submitted to its action. Owing to this, the india-rubber, which is lighter than the ligneous base, tends to rise, and is thus readily separated from the materials remaining upon the sieve. The india-rubber thus separated from the ligneous parts, and which is still impure, may be seen in the form of small agglomerated parts and is then thrown into boiling water. The india-rubber separates from the last ligneous portions and floats in the form of a spongy mass, while the ligneous portions form a deposit. These latter still contain a small quantity of india-rubber and are therefore subjected again to a mechanical treatment in order to effect a complete separation in the manner before stated. The india-rubber is then fully purified by the ordinary processes. In order to complete the purification, the material is subjected to the action of rollers ordinarily employed in the india-rubber industry, hot and cold water being used alternately.

Our process permits of the complete extraction of the india-rubber contained in bark and similar products—such as fruits, leaves, roots, and so on—and to obtain the same without alterations.

As we have mentioned already, we do not limit ourselves to any particular machine for effecting the mechanical treatment according to our process, the essential point being to bring the ligneous portions to a high state of division, so as to cause them to be carried away by the water, while the rubber particles are caused to agglutinate, owing to a prolonged beating.

We are aware that it has been proposed to treat vulcanized india-rubber, such as is found in old shoes, by grinding the same into small particles, then agitating the material so ground in water within a sieve, which supports the rubber, while permitting the heavier substances to subside and the lighter particles to wash away or flow off; but such mode of treatment is essentially distinct from our process as hereinafter claimed, because manufactured rubber, even though in a subdivided state, does not possess the property of agglomerating and forming in groups, in which particles of crude rubber may be collected.

We claim as our invention—

1. The herein-described process of extracting india-rubber consisting of submitting barks or similar material containing crude rubber to a crushing treatment in the presence of water, thereby reducing the ligneous portions to such fine divisions as to be carried away by the water and causing the crude rubber to agglomerate, substantially as described.

2. The herein-described process of extracting india-rubber, consisting of submitting barks or similar material containing crude rubber to a crushing treatment in the presence of water, thereby reducing the ligneous portions to such fine divisions as to be carried away by the water and causing the crude rubber to agglomerate and then treating the agglomerated rubber with hot water to eliminate such particles of ligneous matter as are then incorporated with the agglomerated rubber, substantially as described.

In testimony whereof we have signed our names to this specification in the presence of two subscribing witnesses.

AUGUSTE VICTOR LOUIS VERNEUIL.
ALEXANDRE LOUIS GODEFROY-LEBEUF.
ALBERT LÉON ARNAUD.

Witnesses:
GUSTAVE DUMONT,
EDWARD P. MACLEAN.